United States Patent [19]

Reick

[11] 3,933,656

[45] Jan. 20, 1976

[54] LUBRICATING OIL WITH FLUOROCARBON ADDITIVE

[75] Inventor: Franklin G. Reick, Westwood, N.J.

[73] Assignee: Michael Ebert, Mamaroneck, N.Y.; a part interest

[22] Filed: Jan. 16, 1975

[21] Appl. No.: 541,579

Related U.S. Application Data

[63] Continuation of Ser. No. 377,931, July 10, 1973.

[52] U.S. Cl. .................... 252/25; 252/49.6; 252/58
[51] Int. Cl.$^2$. C10M 1/10; C10M 3/02; C10M 1/50; C10M 7/02
[58] Field of Search ...................... 252/49.6, 58, 25

[56] References Cited
UNITED STATES PATENTS 3,159,577  12/1964  Ambrose et al. ...................... 252/58
3,194,762  7/1965  Browning et al. ...................... 252/58

*Primary Examiner*—Delbert E. Gantz
*Assistant Examiner*—I. Vaughn

[57] ABSTRACT

A lubricant having boundary layer properties to minimize friction between contacting metal parts under low-speed, high-load conditions. The lubricant is constituted by an oil intermixed with a dispersion of microfine fluorocarbon particles having an extremely low-coefficient of friction, the dispersion being stabilized by a charge-neutralizing agent such as a silane.

7 Claims, No Drawings

LUBRICATING OIL WITH FLUOROCARBON ADDITIVE

RELATED APPLICATION:

This application is a continuation of my patent application Ser. No. 377,931, filed July 10, 1973.

BACKGROUND OF THE INVENTION

This invention relates generally to lubricants, and more particularly to lubricating oils having fluorocarbon particles dispersed therein for use in internal combustion engines to reduce the emission of pollutants into the atmosphere.

Even the most carefully finished metal surfaces have minute projections and depressions therein which introduce resistance when one surface is moved relative to another. The application of a lubricant to these surfaces reduces friction by interposing a film of oil therebetween. The rotation of a journal in a bearing draws the oil between it and the bearing so that the two metal surfaces are separated by a very thin film of oil. The degree of friction depends on the viscosity of the oil, the speed of rotation and the load on the journal. If the journal starts rotating after a period of rest, it may not drag enough oil to float the surfaces apart, hence friction will then be considerably greater, the friction being independent of the viscosity of the lubricant and being related only to the load and to the "oiliness" property of the residual lubricant to stick tightly to the metal surfaces. This condition is referred to as "boundary lubrication", for then the moving parts are separated by a film of only molecular thickness which may cause serious damage to the overheated bearing surfaces.

The two most significant characteristics of a hydrodynamic lubricant are its viscosity and its viscosity index; the latter being the relationship between viscosity and temperature. The higher the index the less viscosity will change with temperature. Lubricants serve not only to reduce friction, but also to remove heat developed within the machinery and as a protection against corrosion.

The role played by lubrication in the operation of an internal combustion engine has not been fully appreciated, for while there is widespread concern with deleterious pollutants emitted by vehicles employing such engines, expedients for reducing noxious emissions have not heretofore involved the nature of the engine lubricants.

In an internal combustion engine, the pollutants are constituted by oxides of nitrogen, unburned hydrocarbons and carbon monoxide. The ecological problems created by automobiles are not merely due to the emissions from the engine exhaust into the atmosphere, for the emitted substances produce chemical reactions in the atmosphere when radiant energy is supplied thereto by the sun. Thus photochemical smog, which is now encountered in many major cities, is the result of photochemical reactions involving hydrocarbons from exhaust gases, evaporation losses, and nitric oxide.

Some of the factors which are involved in the emission of pollutants will now be considered.

COMBUSTION CHAMBER DEPOSITS:

Exhaust emission levels of new vehicles undergo appreciable change during the initial 5 to 10 thousand miles of operation. The reason for this change is the formation of deposits on the walls of the combustion chambers. These deposits act as a sponge to absorb hydrocarbons during the compression stroke, to preserve the hydrocarbons within the deposit pores during the flame process and then to discharge them to the atmosphere as unburned hydrocarbons during the exhaust stroke. As the buildup of these deposits take place with accumulated mileage, objectionable hydrocarbon emission levels also increase.

Air-Fuel Ratio:

This ratio has a significant effect on exhaust hydrocarbon emission. It has been found that the emission of unburned hydrocarbon and carbon monoxide can be cut down sharply by leaning the mixture, for then the ratio of oxygen to fuel is high and full combustion takes place. Hydrocarbon emission reductions obtained by operation at lean air-fuel ratios are accompanied by improved fuel economy. But a lean mixture ordinarily results in "surging" and this imposes a practical limitation in reductions that otherwise might be obtainable.

Idling Speed:

The speed at which an engine idles determines its emission output and while a reduced idling speed is highly desirable, with existing lubricants it is not possible to reduce the idling speed to a degree minimizing emission without producing a ragged and unacceptable operation. It must be borne in mind that with the start and stop traffic characteristic of public and private transportation in crowded urban areas, much of vehicular time is spent in idling and this fact accounts in large measure for the high level of pollutants in the atmosphere.

DESCRIPTION OF THE INVENTION

Boundary Layer Lubrication:

When a properly lubricated automobile engine is run at moderate speeds and loads, there is little actual metal-to-metal contact; hence a condition of hydrodynamic stability exists. The oil forms films between the parts, while the relative motion keeps all mechanisms hydroplaning on the fluid.

The condition which prevails in an internal combustion engine is quite different under low-speed, high-load conditions, for then the oil films cannot separate the parts. Metal contact occurs and surface welding, plowing and peak-shearing occurs, all contributing to high friction and wear. As a consequence, heat is generated and power is wasted.

Usually metal surfaces carry films of solid oxides that tend to have naturally lubricating quality to reduce galling, etc. But even these films are penetrated under high load conditions. Extreme pressure, boundary lubrication without the use of solid lubricants is impossible.

Several solid materials have heretofore been used to perform these functions. Among these are $MOS_2$ (Molybdenum disulfide), Graphite and Teflon. Teflon is the Du Pont trademark for tetrafluoroethylene (TFE) fluorocarbon polymers. Other materials have been used to form oxide, sulfide or chloride films on surfaces under high pressure conditions. Some are the chlorinated polyphenols (Arochlors, Manufactured by Monsanto). However, their environmental toxicity has caused them to be removed from the market in recent years.

The present invention resides in a solid lubricant serving as an oil additive and providing a high order of boundary layer lubrication which reduces friction and minimizes heating. Because of its extraordinary physical and chemical properties, Teflon is the preferred additive. However, for best results, it is essential that the Teflon be incorporated in the oil as microfine particles and that it be uniformly dispersed therein, without agglomeration. The Teflon particles must pass easily through an oil filter and between closely machined metal surfaces, such as those existing in hydraulic valve lifters.

The following is a list of the various particle sizes of commercially available Teflon.

| CORPORATION | MATERIAL | SIZE |
|---|---|---|
| Whitcon | Teflon Powder | less than 1 Micron |
| Liquid Nitrogen Corp. (LNC) | Teflon Powder | 8–10 Microns |
| Du Pont | TFE-42 | .05 – .5 Microns |
|  | T-30 dispersions |  |

The exceptionally small particle size of the Du Pont products makes them the best candidates for boundary layer lubricants.

Teflon dispersions, such as dispersions designated T-30 TD-1 and TFE-42 of Du Pont are highly unstable. As noted in the DuPont literature:

"Teflon 42 dispersion will settle on prolonged standin or a heating above 150°f. It can be redispersed by mild agitation. Stock being stored for an indefinite period should be redispersed at least every 2 weeks by inverting or rolling the container. High speed stirring or violent agitation should be avoided since this will cause irreversible coagulation. The dispersion should be protected from the atmosphere to prevent coagulation by drying. It should be protected against freezing at all times to prevent irreversible coagulation."

The T-30 and similar aqueous dispersions are hydrophob colloids with negatively charged particles. In a dispersion in which 60% is in the form of solids, there are approximately 0.9 grams of Teflon for each cc of solution.

In order to render the Teflon dispersion stable, I have discovered that by adding a silane or silizane thereto such as amino silane (Dow-A1100) or Methyl trichloro silane (Dow Corning Z1211), the resultant dispersions are remarkably freeze-thaw stable. While the reason for this stability is not fully understood, it is believed that a cloud of silane atoms attaches itself to each of the Teflon particles and precludes clumping thereof by neutralizing the surface charges. Thus, the silane acts as a charge neutralizing agent.

When 300 cc of a T-30 Teflon dispersion is mixed with 30 cc of Z6020 amino functional silane or Z6079 hexamethyl disilizane (a strong alkali) that releases ammonia on exposure to moisture, it can be repeatedly frozen solid and thawed without any loss of properties. It can be infinitely dispersed in water, oil, emulsion paints and lacquers, since the silane prevents particle contact coagulation. Best results have been obtained with a ratio of 300 cc of Teflon dispersion T-3 to 15 cc of silane or silizane. A lesser ratio leads to some irreversibility whereas a silane of 50/50 gives an irreversible jell as the silne competes for water with the Teflon particles.

When the stabilized Teflon dispersion is intermixed with a lubricating oil, the oil functions as a hydrodynamic lubricant at moderate and high speeds of the lubricated vehicle. But in slow-speed, high load conditions where oil is usually not effective, the Teflon particles coat the metal surfaces to form a solid boundary layer lubricant that reduces friction and minimizes heat.

Another useful stabilizing agent is fumed $Al_2O_3$ (Alon) manufactured by G. L. Cabot Corp. Alon is composed of particles whose dimensions are about .01u that are clumped into .1u aggregates. It is one of the few particles that possesses a positive surface charge up to ph 9.1, the isoelectric point. Suspensions containing negative charges are obtained by adjusting the ph above 10 so when the ammonia of the silizanes in the mixes dissipates, the Alon particles will migrate to the Teflon particles and neutralize the charge and control clumping. This has been tested and found to be the case although it does not have the same effect on freeze thaw as the silizanes/silanes.

When preparing Teflon - Oil greases, the thixotropic quality is enhanced by using Alon. The discrete nature of the particles is easier to retain and there is less tendency to sheet out into films.

METHOD FOR ADDING FLUOROCARBON DISPERSIONS TO INTERNAL COMBUSTION ENGINE CRANKCASES:

It is important that the total concentration of dispersed fluorocarbon that is added to an internal combustion engine be very small. If the particles are not widely separated and discrete there will be a tendency to sheet and form clumps that can cause trouble with hydraulic valve lifters. Moreover, the agglomerated particles will readily be removed by the oil filter.

The following procedure for adding dispersion has worked well:

A. Take 200 cc of T-30 Teflon dispersion - add 20 cc of Hexamethyl Di Silizane (Dow Corning Z-6079). A very fluid product is obtained that is readily dispersed in oil, etc.

B. Take one quart of engine oil (the type used is unimportant) and add 20 cc of Dow Corning Z6020 or A1100 to it (Aminofunctional silane).

C. The two (A & B) are mixed together, producing a fine milky dispersion. The water of dispersion of the T-30 hydrolizes the silanes thereby forming a fine web work of molecules that protects and separates the Teflon particles. There is a slight tendency to settle, but redispersion is effected with the mildest agitation.

The solution is still much too concentrated for engines but is superior as a lubricant for differential gears and high shear systems where small orifices are not present. To treat an engine about 200 cc of the above-described solution is added to a cold engine (5 quarts of oil) and then run to disperse the fluorocarbon particles throughout the system.

It will be found that the engine runs progressively smoother as the internal surfaces acquire a coating of Teflon. There is a tendency for the oil filter to remove the larger particles and any clumps that form but enough Teflon continues circulating a repair damaged areas and to maintain exceptional internal lubrication.

The engine can then be idled very low by first adjusting the carburetor's idle jets until the engine operation appears somewhat rough, then backing off and setting the final idle with the throttle adjusting screw.

The water that is in the mix is boiled off after the engine reaches operating temperature, leaving the fluorocarbons and hydrolized silanes circulating. The silanes are very surface active and doubtless enhance the lubricity of the whole system. The technology for preventing settling altogether using protective colloids is well known in the art and will not be discussed here.

ROAD TESTS:

The following mixture was prepared for use in testing internal combustion engines. The dispersion was constituted by 300 cc of Teflon T-30 to 30 cc of silane (A 1100). The dispersion was then mixed with an equal volume of Amoco motor oil to produce a pourable grease having exceptional lubricating properties. As pointed out previously, any acceptable brand of lubricating oil may be modified by a dispersion in accordance with the invention.

I. When this grease was added to the crankcase of a 1966 white Chevrolet (V8) Station Wagon having a manifold vacuum gauge and an electrical tachometer (118,659.6 odometer), the following results were obtained.

| HOT ENGINE — NEUTRAL | BEFORE | 5 MIN. | 10 MIN. | 3 HFS |
|---|---|---|---|---|
| TACK READING RPM | 725–750 | 750 | 800 | 825 |
| MANIFOLD PRESSURE (IN Hg) | 20.5 | 21.0 | 21–21.5 | 22 |

It will be noted that the RPM and Manifold pressure values rose with time. The engine idles faster because it is better lubricated. It takes awhile for the Teflon to get around in the system, so that the improvement takes at least one hour to become apparent.

The idle was then reset and cut back until it was a trifle ragged. This gave 500 RPM in Neutral, 19 in Hg, on the vacuum gauge. (Chevrolet calls for 600 RPM in drive). The vehicle now had 350 RPM in drive. The engine was road tested for several hundred miles, and became smoother with continued operation. Apparently the Teflon particles wear into the surfaces, perhaps helped by the Hydrolized A1100 silane which is very surface active.

The significance of the super-pressure lubricant to an engine is that most of the exhaust pollution in the major urban areas is caused by engines in traffic, the engines idling. If they could idle at half the usual speed (RPM), less material would be blowing out the exhaust pipe. There should also be significant fuel savings.

II. The above-mentioned 1966 White Chevrolet V8 with hydraulic lifters was run several days with the Teflon dispersion in the crankcase. It was then tested for exhaust gas pollutants with a new Allen Infrared Exhaust Gas analyzer. The results were 2% CO (carbon monoxide) and 400 RPM HC (hydrocarbons) idling at 375–400 RPM in Drive. The state of New Jersey standards are:

|  | 1966 - earlier | 1968–1969 | 1970–1971 |
|---|---|---|---|
| %CO | 10% | 8% | 6% |
| HC (RPM) | 1600 | 800 | 600 |

Note that this car with a gross mileage of about 120,000 with no major engine work ever done on it and with only the simplest pollution controls (PVC valve) is now exceeding the exhaust emission standards for 1970–1974 by a considerable margin. (No equipment was available for testing nitrogen oxide.)

The difference is that the test is run at idle on a super-smooth, lean engine with dispersed Teflon powder boundary layer lubrication. Since a great deal of pollution is generated by idling and deaccelerating engines, this could help the atmospheric problem considerably. The hydraulic lifters on the engine are quiet and working smoothly.

III. A dispersion of 100 cc concentrated, stabilized T-30 in an equal volume of engine oil was added to the crankcase of a 1969 Ford LTD (V8) Station Wagon (approx. 35,000 miles), while idling.

| TACHO-METER | BEFORE 400–425 (Ragged) | 5 MIN. 400–425 | 10 MIN. 400–425 | 1 HR. 425–450 | 2 HR. Smooth 450 |
|---|---|---|---|---|---|

TRANSMISSION IN NEUTRAL

The Teflon dispersion was too concentrated and valve lifter noise commenced after 2 hours in spite of the smooth operation. Remember that the preferred mixes are now recommended as highly dilute for this reason. The engine runs remarkably smooth in spite of jammed lifters.

IV. Dodge 1952, 8 cylinder Pick-up Truck (over 100,000 Miles). Before treatment, the engine of this vehicle was pumping oil badly. The preferred mix was added to the crankcase. In several hours the oil fumes passing out of the tail pipe were greatly reduced.

V. 1957 Pickup Truck 80,000 Miles, 6 cylinder, 235 cu. in. This machine had a 6 cylinder junk yard engine of unknown past. It was greatly smoothed by the addition of the Teflon-oil lubricant.

VI. Ford Falcon, 1960, 80,000 miles. Poorly maintained car that was using 1½ quarts of oil per week. After one week with the Teflon dispersion and oil mixture in the crankcase the oil consumption had dropped to ½ quart.

VII. Three lawn mowers and a go-kart were treated. All operated with less smoke and more power. Very smooth operation.

REDUCTION OF SURFACE PRE-IGNITION:

The inner surface of the combustion chamber in a conventional piston engine is loaded with catalytically-active hot spots caused by surface roughness of the cast iron and sharp edges on the pistons. A debris of ash deposits (lead compounds) and dirt from carbonized oil and dispersing agents coat the top of the chamber and piston. But the cylinder walls are relatively clean, for they are wiped and oiled on each stroke of the piston.

Several undesirable results ensue: A portion of the engine knock or ping is caused by ignition from surface hot spots that is out of phase with the firing of the spark plugs. This leads to poor combustion and rough performance. The formation of nitrous oxides (a mixture too lean and hot) and unburned hydrocarbons (a misture too rich and cold) is spotty, and exhaust gases are difficult to control.

A solution to the problem which is at least partially effective involves the following:

1. Minimizing the accumulation of the deposits in the combustion chamber by Teflon coating the head and piston with an easily applied spray (Teflon S). Since adhesion to the Teflon will be poor, the debris will blow out the tail pipe and not accumulate.

2. For engines that are already in use, apply the Teflon in another form as a powder that is very slowly fed into the intake manifold. The heat of combustion softens it and causes coating of the surfaces.

Experiments have been run in three active engines with the following results:

ENGINE No. 1

Black and White Rambler, 6 cylinder Station Wagon, odometer reading - 77,004. The engine was overhauled and one damaged piston replaced. The remaining pistons, scratched and scoured from metal floating in the oil, were scraped clean of carbon deposits and vapor degreased. All pistons were sprayed with Teflon S. The old scoured rod bearings were treated similarly.

The engine was reassembled, the oil flushed several times and it is now running reasonably well. One scoured cylinder contributed to oil pumping. No ping noticeable when accelerated. The head was not coated.

ENGINE No. 2

White 1966 Chevrolet, 8 cylinder, Station Wagon. This machine has over 130,000 miles on it. A manifold vacuum gauge was installed and read 15 inches Hg at idle, with the transmission in "park."

While idling, a hexane dispersion of Teflon power (LNP Corp.) was sprayed into the carburetor. The manifold vacuum went to 20 inches (faster idle, lower friction in upper cylinders). The pressure dropped back a bit to 18 inches and then held steady for about 100 miles. This was a rather loose engine to begin with. It took several days for the manifold vacuum to return to 15 inches. Fricton increased as the Teflon wore and scuffed off the ring, cylinder and piston surfaces.

ENGINE No. 3

Green 1969 Ford Station Wagon (33,525 miles). This engine has emission controls on it but not as extensive as those on 1973 cars. It idles very poorly when cold and not too well when warm and stalled easily if accelerated when cold. The engine pinged when accelerated after it was warmed up.

Teflon in a hexane dispersion was sprayed into the carburetor and it was noticed that the idle smoothed dramatically Even more noticeable - there was not longer any ping when the engine was accelerated.

With the engine idle set at about 350 to 400 RPM, much lower than the usual, relatively high RPM rate prescribed by manufacturers for idling, and with the leanness of the fuel-air mixture at its optimum value for smooth operation in the idling mode, the emission of pollutants is reduced to a marked degree. However, if the air is admitted into the engine in an excessively hot and expanding state, this adversely affects the leanness of the mixture. It is desireable, therefore, to induce air in a relatively cool state and for this purpose the engine may be provided with a thermostatically-controlled device to open the air intake directly to the atmosphere when the temperature of the air being taken in exceeds a predetermined level.

The viscosity of the oil used in conjunction with the additive should be such that oil pressure in a hot-loose engine stays at about 25 to 30 p.s.i. when the engine idles at low speed (350 RPM). Fortunately, available multi-viscosity oils (10-30-40 etc.) contain coiled chain or spiral polymers that expand or open under heat to increase the viscosity of the oil. This provides a low viscosity when cold for easy starting, and a high viscosity to maintain oil pressure when hot. An additive in accordance with the invention may be incorporated in such oils with suitable protective colloids and detergents to maintain good dispersion in the crankcase. In some instances, suitable thickeners may be added to the oil, such as a polybutane.

While there have been disclosed preferred embodiments of a lubricating oil with fluorocarbon additive, it is to be understood that many changes may be made therein without departing from the essential spirit of the invention.

I CLAIM:

1. A modified oil lubricant suitable for a combustion engine provided with an oil filter, said lubricant comprising major amounts of a liquid lubricating oil intermingled with minor amounts of a dispersion of polytetrafluoroethylene particles in the sub-micron range and a charge neutralizing agent stabilizing the dispersion to prevent agglomeration and coagulation of the particles, whereby the lubricant is capable of passing through said oil filter without separation of the particles from the oil.

2. A modified oil lubricant as set forth in claim 1, wherein said agents are selected from the group consisting of silanes and silizanes.

3. A modified oil lubricant as set forth in claim 1, wherein said particles are in an aqueous dispersion and in a range of 0.05 to 0.5 microns.

4. A modified oil lubricant as set forth in claim 1, wherein said agent is fumed $Al_2O_3$.

5. A method of improving the operation of an internal combustion engine comprising the steps of adding to the normal lubricating oil for the engine a small but effective amount of an aqueous dispersion of polytetrafluoroethylene particles in the sub-micron range and a charge neutralizing agent stabilizing the dispersion to prevent agglomeration and coagulation of the particles, thereby to impart boundary layer lubricating properties to the oil, then reducing the idling speed of the engine below the prescribed level, and leaving the air-fuel mixture for the engine whereby the emission of pollutants from the engine is significantly reduced.

6. A method as set forth in claim 5, further including the steps of reducing the idling speed of the engine below the level prescribed therefor, and leaving the air-fuel mixture for the engine.

7. A method as set forth in claim 5, further including the step of drawing into the engine relatively cool air to constitute said air-fuel mixture.

* * * * *

UNITED STATES PATENT OFFICE
CERTIFICATE OF CORRECTION

Patent No. 3,933,656          Dated January 20, 1976

Inventor(s)     Franklin G. Reick

It is certified that error appears in the above-identified patent and that said Letters Patent are hereby corrected as shown below:

```
Column 3, line 29 "din" should have read -- ding --
Column 3, line 39 "phob" should have read -- phobic --
Column 3, line 63 "silane" should have read -- ratio --
Column 3, line 64 "silne" should have read -- silane --
Column 4, line 60 "a" should have read -- to --
Column 5, line 25 "HFS" should have read -- HRS --
Column 6, line 61 "mixture" should have read -- mixture --
Column 7, line 47 "not" should have read -- no --
```

Signed and Sealed this thirteenth Day of April 1976

[SEAL]

Attest:

RUTH C. MASON
*Attesting Officer*

C. MARSHALL DANN
*Commissioner of Patents and Trademarks*